(12) United States Patent
Inagaki et al.

(10) Patent No.: US 9,150,425 B2
(45) Date of Patent: Oct. 6, 2015

(54) ACTIVE MATERIAL FOR BATTERY, NON-AQUEOUS ELECTROLYTE BATTERY AND BATTERY PACK

(75) Inventors: Hiroki Inagaki, Kawasaki (JP); Wen Zhang, Sagamihara (JP); Yasuhiro Harada, Yokohama (JP); Keigo Hoshina, Yokohama (JP); Yuki Otani, Kawasaki (JP); Norio Takami, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 520 days.

(21) Appl. No.: 12/868,064

(22) Filed: Aug. 25, 2010

(65) Prior Publication Data

US 2011/0052942 A1    Mar. 3, 2011

(30) Foreign Application Priority Data

Aug. 26, 2009   (JP) .............................. 2009-195369

(51) Int. Cl.
*H01M 4/02* (2006.01)
*C01G 23/047* (2006.01)
(Continued)

(52) U.S. Cl.
CPC .............. *C01G 23/047* (2013.01); *B82Y 30/00* (2013.01); *H01M 4/485* (2013.01); *C01P 2002/54* (2013.01); *C01P 2002/76* (2013.01); *C01P 2002/82* (2013.01); *C01P 2004/61* (2013.01); *C01P 2004/62* (2013.01); *C01P 2004/64* (2013.01); *C01P 2006/12* (2013.01); *Y02E 60/122* (2013.01)

(58) Field of Classification Search
USPC ............................................................ 429/7
See application file for complete search history.

(56) References Cited

U.S. PATENT DOCUMENTS

2001/0053480 A1* 12/2001 Koga et al. ................. 429/218.1
2004/0101744 A1*  5/2004 Suzuki ............................. 429/61
(Continued)

FOREIGN PATENT DOCUMENTS

| JP | 2007-87909 | 4/2007 |
|---|---|---|
| JP | 2007-220409 | 8/2007 |
| JP | 2008-34368 | 2/2008 |

(Continued)

OTHER PUBLICATIONS

Inaba et al. "TiO2(B) as a promising high potential negative electrode for large-size lithium-ion batteries" Journal of Power Sources, vol. 189 Iss. 1, Apr. 2009, pp. 580-584.*

(Continued)

*Primary Examiner* — Ula Ruddock
*Assistant Examiner* — Jacob Marks
(74) *Attorney, Agent, or Firm* — Oblon, McClelland, Maier & Neustadt, L.L.P.

(57) ABSTRACT

According to one embodiment, an active material for a battery includes a titanium composite oxide. The titanium composite oxide contains a monoclinic β-type titanium composite oxide as its main phase and has a ratio $(A_2/A_1)$ which is 0.4 or less, where $A_1$ is an area intensity of a first peak existing in a frequency range of 105 $cm^{-1}$ to 133 $cm^{-1}$ and $A_2$ is an area intensity of a second peak existing in a frequency range of 134 $cm^{-1}$ to 154 $cm^{-1}$ on a Raman spectrum measured using an argon laser having a wavelength of 514.5 nm.

15 Claims, 7 Drawing Sheets

(51) Int. Cl.
 *B82Y 30/00* (2011.01)
 *H01M 4/485* (2010.01)

(56) References Cited

U.S. PATENT DOCUMENTS

2004/0229124 A1* 11/2004 Miyamoto et al. ......... 429/231.1
2007/0243462 A1* 10/2007 Nagatani et al. ............. 429/185

FOREIGN PATENT DOCUMENTS

| JP | 2008-117625 | 5/2008 |
| JP | 2009-117259 | 5/2009 |
| JP | 2010-55855 | 3/2010 |
| JP | 2010-123401 | 6/2010 |
| WO | WO 2006/033069 A2 | 3/2006 |
| WO | WO 2009/028553 A1 | 3/2009 |

OTHER PUBLICATIONS

U.S. Appl. No. 12/850,160, filed Aug. 4, 2010, Inagaki, et al.
U.S. Appl. No. 12/862,118, filed Aug. 24, 2010, Harada, et al.
U.S. Appl. No. 13/238,415, filed Sep. 21, 2011, Harada, et al.
U.S. Appl. No. 13/053,913, filed Mar. 22, 2011, Inagaki, et al.
U.S. Appl. No. 13/053,865, filed Mar. 22, 2011, Inagaki, et al.
Japanese Office Action issued Jan. 24, 2012 in Patent Application No. 2009-195369 with English Translation.
Kazuki Chiba et al., "Soft Chemical Synthesis and Electrochemical Properties of Layered Titanates", Collection of Summaries of Seminars in 47$^{th}$ Battery Symposium, Nov. 20, 2006, pp. 602-603.

* cited by examiner

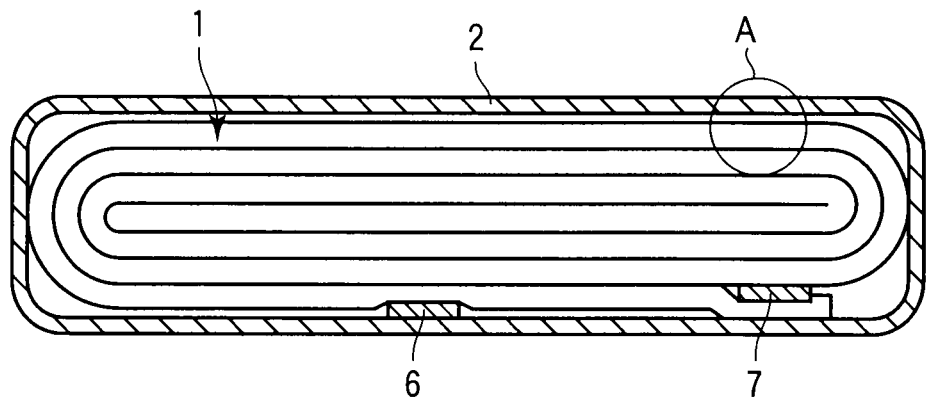
F I G. 1
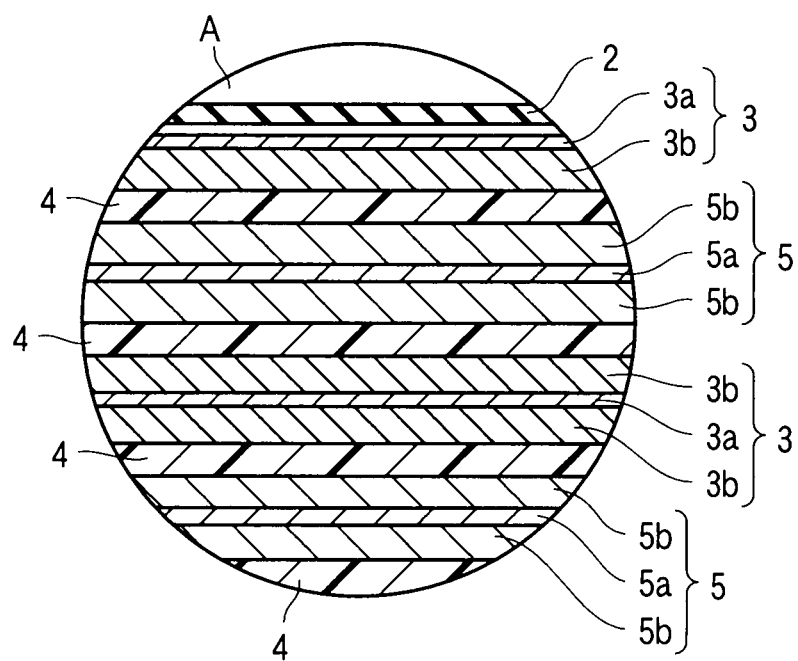
F I G. 2

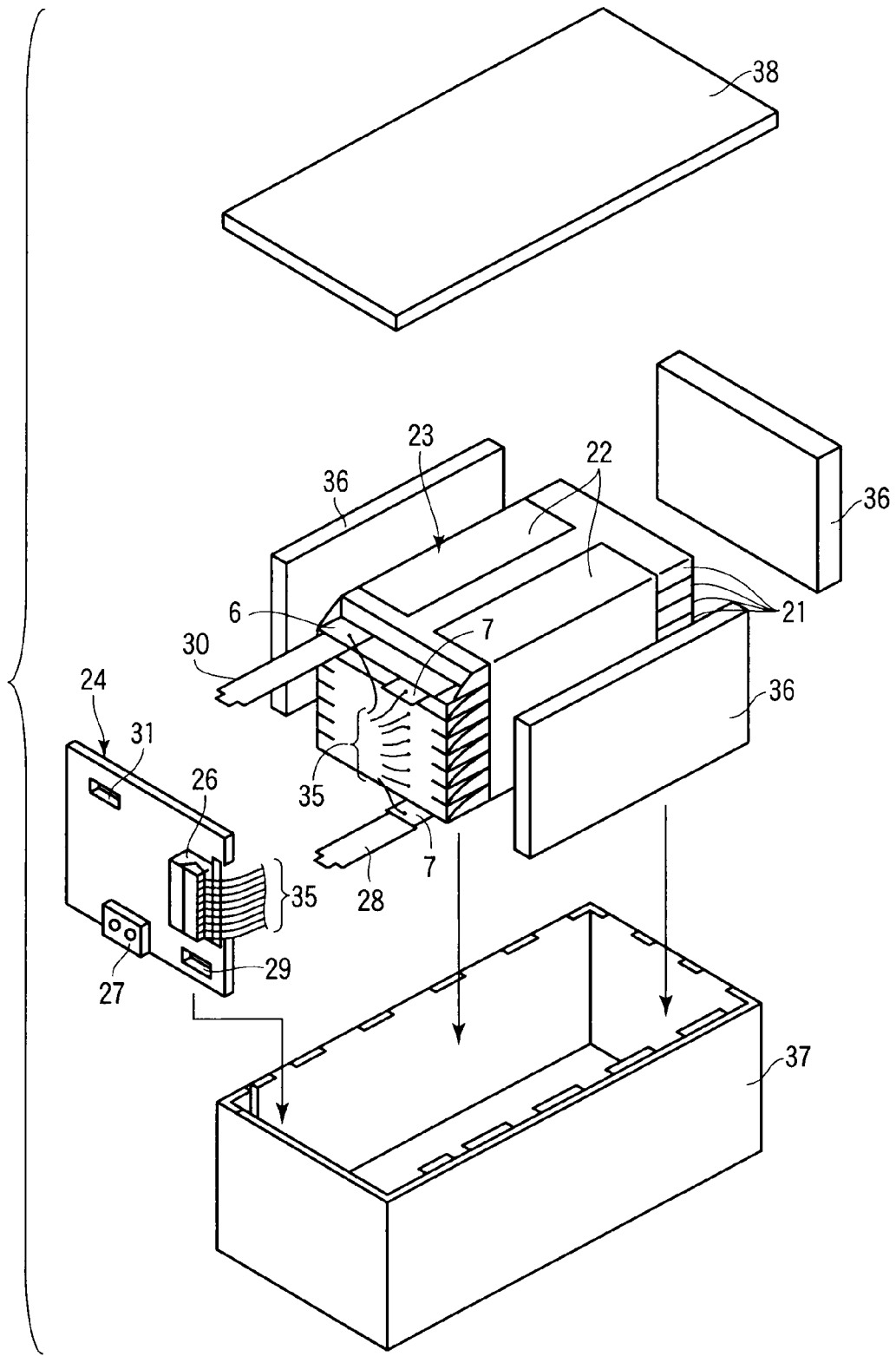
F I G. 3

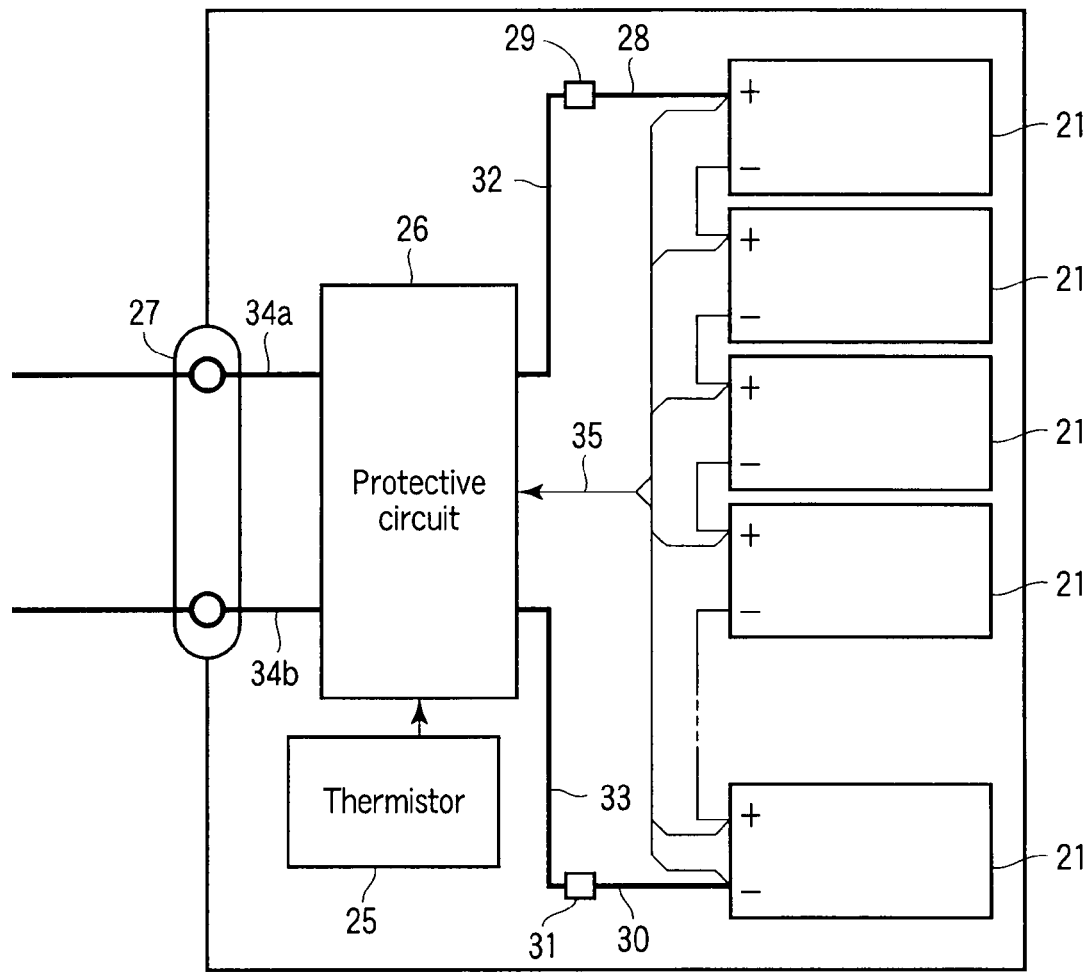
F I G. 4

ACTIVE MATERIAL FOR BATTERY, NON-AQUEOUS ELECTROLYTE BATTERY AND BATTERY PACK

CROSS-REFERENCE TO RELATED APPLICATIONS

This application is based upon and claims the benefit of priority from Japanese Patent Application No. 2009-195369, filed Aug. 26, 2009; the entire contents of which are incorporated herein by reference.

FIELD

Embodiments described herein relate generally to an active material for a battery, a non-aqueous electrolyte battery and a battery pack.

BACKGROUND

Titanium oxide (represented by $TiO_2(B)$) having a monoclinic β-type structure has recently attracted much attention as an active material for a non-aqueous electrolyte battery. Spinel type lithium titanate ($Li_4Ti_5O_{12}$), which is currently in practical use, is limited to 3 in the number of lithium ions which can be inserted and desorbed per unit chemical formula. For this reason, the number of lithium ions which can be inserted and desorbed per titanium ion is 3/5 (0.6) which is a theoretical maximum. In the case of $TiO_2$ (B), on the other hand, the number of lithium ions which can be inserted and desorbed per titanium ion is 1.0 at maximum. Therefore, $TiO_2$ (B) has a theoretical capacity as high as about 335 mAh/g.

However, the practical electrode capacity of $TiO_2$ (B) is about 170 to 200 mAh/g, which is significantly lower than the theoretical capacity. This is because, though there are many sites which can serve as Li hosts in a crystal structure of $TiO_2$ (B), mobile Li ions are reduced because the diffusibility of Li ions in a solid is low, and also, Li ions are trapped by impurity phases and crystal grain boundaries. Accordingly, the initial irreversible capacity is large, and therefore a high capacity cannot be obtained.

BRIEF DESCRIPTION OF THE DRAWINGS

FIG. 1 is a sectional view showing a flat type non-aqueous electrolyte battery according to an embodiment;

FIG. 2 is an enlarged sectional view of the part A of FIG. 1;

FIG. 3 is an exploded perspective view showing a battery pack according to an embodiment;

FIG. 4 is a block diagram of the battery pack shown in FIG. 3;

DETAILED DESCRIPTION

In general, according to one embodiment, an active material for a battery includes a titanium composite oxide, wherein the titanium composite oxide contains a monoclinic β-type titanium composite oxide as its main phase and has a ratio ($A_2/A_1$) which is 0.4 or less, where $A_1$ is the area intensity of a first peak existing in a frequency range of 105 $cm^{-1}$ to 133 $cm^{-1}$ and $A_2$ is the area intensity of a second peak existing in a frequency range of 134 $cm^{-1}$ to 154 $cm^{-1}$ on a Raman spectrum measured using an argon laser having a wavelength of 514.5 nm.

In such a Raman spectroscopy using an argon laser, the first peak belonging to a monoclinic β-type titanium composite oxide is detected at about 119 $cm^{-1}$ and the second peak belonging to an anatase type $TiO_2$ is detected at about 144 $cm^{-1}$. Specifically, the area intensity $A_1$ indicates the relative amount of the monoclinic β-type titanium composite oxide which is a main phase in the titanium composite oxide, and the area intensity $A_2$ indicates the relative amount of the anatase type $TiO_2$ in the titanium composite oxide.

A band width of the first peak is 16 $cm^{-1}$ or less and is preferably 14 $cm^{-1}$ or less. The band width used herein means a peak half width at half maximum (HWHM).

The Raman spectral method for obtaining the Raman spectrum will be explained below.

A powder (sample) obtained by pulverizing a titanium composite oxide is dispersed on a glass sample plate and a glass plate is placed on the dispersed powder by hand and pressed lightly from above, thereby filling the powder into the glass sample plate. Also, in the case of measuring a sheet electrode as a sample, a cut electrode is put on a glass substrate and a glass plate is put on the electrode by hand and pressed lightly from above, thereby sticking the electrode to the glass substrate.

The measurement is carried out under the following conditions.

<Measuring Method>

Laser Raman spectrometer: T-64000 (Horiba Jobin Yvon)
Measuring mode: Macro-Raman
Beam diameter: 100 μm
Light source: $Ar^+$ laser/514.5 nm
Laser power: 10-30 mW
Diffraction lattice: Spectrograph 600 gr/mm, 1800 gr/mm
Dispersion: Single 21 A/mm, 7 A/mm
Slit: 100 μm
Detector: CCD (Jovin Yvon 1024×256)

Also, the area intensity can be found by the following method.

Figure 7:
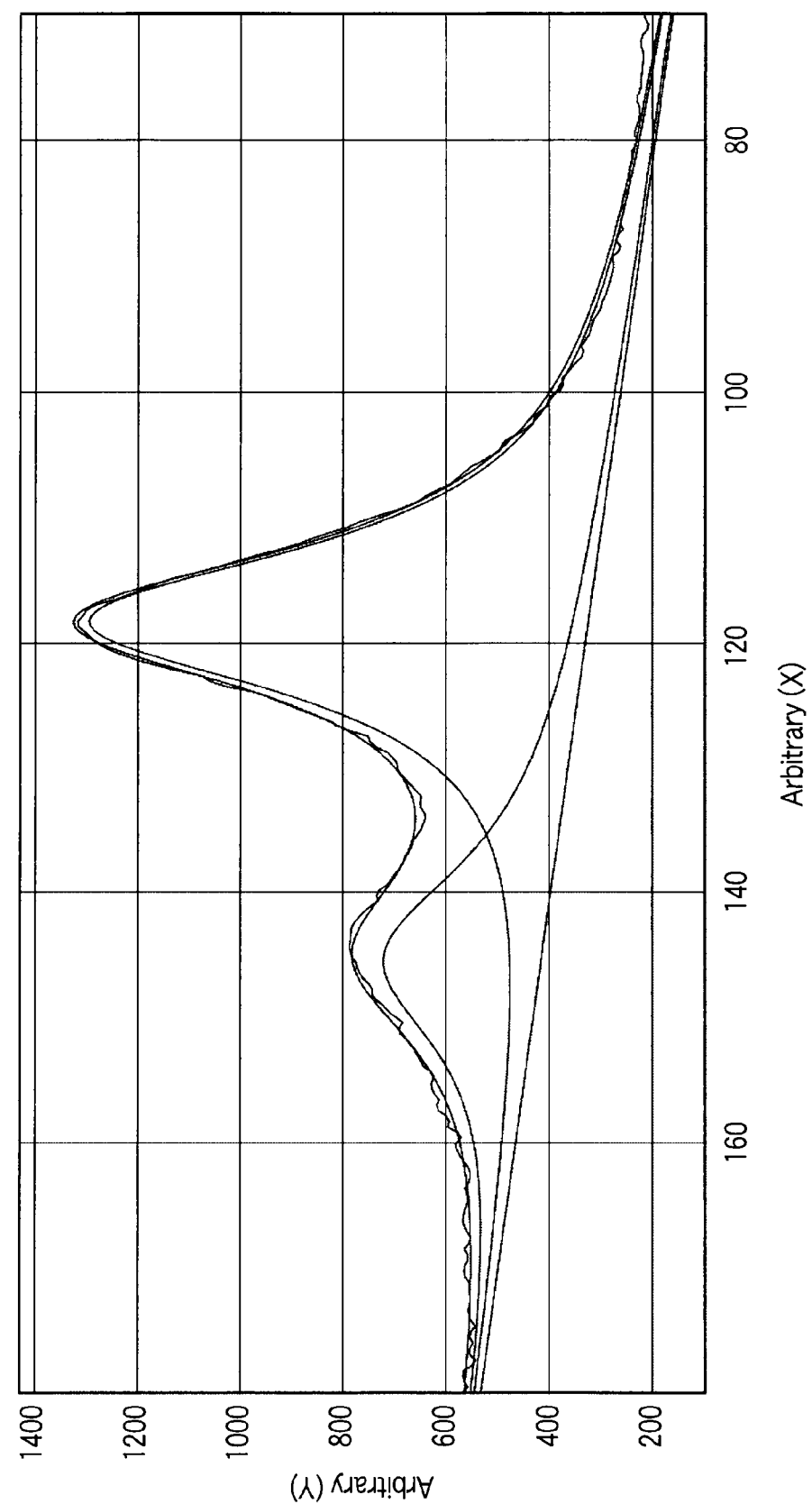
FIG. 7 is a graph showing the results of peak separation of the Raman spectrum shown in FIG. 5.

In a Raman spectrum obtained after the measurement, a base line is drawn as a straight line in a frequency range of 70 to 170 $cm^{-1}$. A Lorentz function is assumed as the spectrum in the vicinities of frequencies of 119 $cm^{-1}$ and 144 $cm^{-1}$ and the calculation for optimization is performed using the least square method to separate the peaks. For example, FIG. 7 shows the results of the peak separation of the spectrum of FIG. 5. The area of the separated peak is calculated as the area intensity.

The ratio of area intensities and the value of peak width are found by measuring each at three random places on the glass sample plate to calculate an average of the obtained measured data. A variation between samples can be reduced by this operation.

Figure 8:
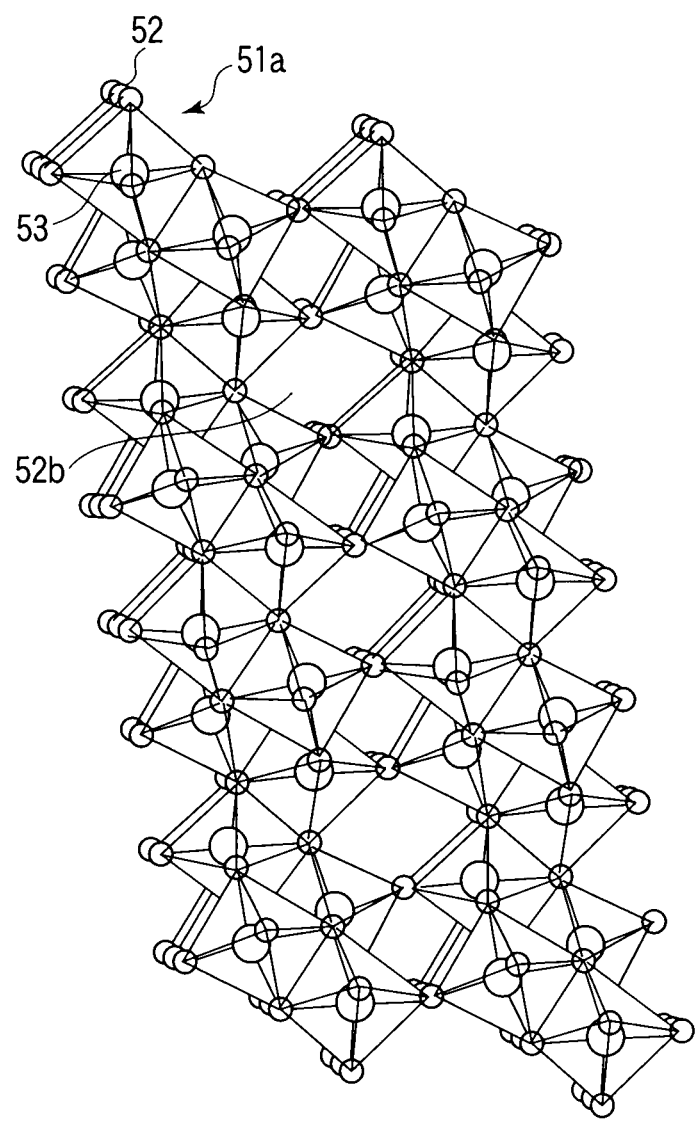
FIG. 8 is a typical view showing the crystal structure of a monoclinic β-type titanium oxide ($TiO_2$ (B)).

The crystal structure of monoclinic titanium dioxide is represented by $TiO_2$ (B). The crystal structure represented by $TiO_2$ (B) belongs mainly to a space group C2/m and has a tunnel structure as shown in FIG. 8. Details of the crystal structure of $TiO_2$ (B) are described in a reference, R. Marchand, L. Brohan and M. Tournoux "Material Research".

As shown in FIG. 8, the crystal structure represented by $TiO_2$ (B) has skeleton structure parts 51a which are each constituted of a titanium ion 53 and an oxide ion 52 and are alternately arranged side by side. A space part 51b is formed between these skeleton structure parts 51a. This space part 51*b* is allowed to serve as a host site for the insertion of heteroatom species. $TiO_2$ (B) is said to have host sites capable of inserting and releasing heteroatom species also on the surface of the crystal. When lithium ions are inserted into and desorbed from these host sites in this manner, $TiO_2$ (B) can be inserted and desorbed lithium ions reversibly.

When lithium ions are inserted into the space parts 51*b*, $Ti^{4+}$ forming the skeleton is reduced to $Ti^{3+}$, to thereby maintain an electrically neutral state of the crystal. Because $TiO_2$ (B) has one $Ti^{4+}$ per chemical formula, it is theoretically possible to insert up to one lithium ion between layers. For this reason, titanium oxide compounds having a crystal structure of $TiO_2$ (B) may be represented by the formula $Li_xTiO_2$ ($0 \leq x \leq 1$). In this case, each of these titanium oxide compounds ensures a theoretical capacity of 335 mAh, which is close to two times that of usual titanium dioxide.

However, since $TiO_2$ (B) is a low-temperature metastable phase existing at a temperature as low as about 500° C. or less and therefore, anatase-type $TiO_2$ tends to intermingle with $TiO_2$ (B) as an impurity phase. This anatase-type $TiO_2$ has a large irreversible capacity in the initial charging and also, has low reversibility of charge and discharge. For this reason, a titanium composite oxide containing anatase-type $TiO_2$ has a low initial charge/discharge efficiency and is therefore deteriorated in charge/discharge cycle characteristics. Namely, it is difficult to obtain a high-capacity titanium composite oxide having a high initial charge/discharge efficiency and better charge/discharge cycle performance.

The active material for a battery according to an embodiment contains a monoclinic β-type titanium composite oxide ($TiO_2$ (B)) as its main phase and has the ratio ($A_2/A_1$) which is 0.4 or less, where $A_1$ is the area intensity of a first peak existing in a frequency range of 105 $cm^{-1}$ to 133 $cm^{-1}$ and $A_2$ is the area intensity of a second peak existing in a frequency range of 134 $cm^{-1}$ to 154 $cm^{-1}$ on a Raman spectrum measured using an argon laser having a wavelength of 514.5 nm. Such a titanium composite oxide contains $TiO_2$ (B) as its main phase in a high ratio and therefore, the contamination of anatase-type $TiO_2$ having a large irreversible capacity in the initial charging is reduced or substantially zero. For this reason, the initial charge/discharge efficiency is high and also, the charge/discharge cycle performance can be improved. As a result, a high capacity specific to $TiO_2$ (B) can be maintained for a long period of time.

The charge/discharge efficiency of the titanium composite oxide and the charge/discharge cycle performance can be improved by designing the ratio ($A_2/A_1$) which is 0.4 or less. The ratio ($A_2/A_1$) is more preferably 0.35 or less and even more preferably 0.3 or less. The titanium composite oxide preferably contains no impurity phase and has a structure essentially consisting of $TiO_2$ (B) which is substantially a main phase. Therefore, the area intensity $A_2$ of the second peak includes a state below a detection limit, that is, a state of zero.

The band width of the first peak is preferably 16 $cm^{-1}$ or less. The band width of the first peak has a correlation with the crystallinity of a material and decreases with increase in the crystallinity of the monoclinic β-type titanium composite oxide ($TiO_2$ (B)). As the diffusion rate of lithium ions of the titanium composite oxide raises with the lower the band width of the first peak, that is, with the higher the crystallinity, the ion conductivity of lithium can be improved. Also, Li ions are scarcely trapped by, for example, crystal grain boundaries and therefore, the charge/discharge efficiency can be improved.

When the band width of the first peak is 16 $cm^{-1}$ or less as mentioned above, the ion conductivity and large-current characteristics of the titanium composite oxide and the charge/discharge efficiency can be improved. The band width of the first peak is more preferably 14 $cm^{-1}$ or less.

The primary particle diameter of the titanium composite oxide is preferably 30 nm or more and 3 μm or less. When the primary particle diameter is 30 nm or more, the titanium composite oxide can be easily handled in industrial production. When the primary particle diameter is 3 μm or less, the in-solid diffusion distance of lithium ions is short, making it possible to improve the large-current characteristics. The primary particle diameter is more preferably 30 nm or more and 1 μm or less.

The specific surface area of the titanium composite oxide is preferably 5 $m^2/g$ or more and 50 $m^2/g$ or less. When the specific surface area is 5 $m^2/g$ or more, ample lithium ion-inserting and desorbing sites can be secured. When the specific surface area is 50 $m^2/g$ or less, the titanium composite oxide is easily handled in industrial production.

Next, a method of producing an active material for a battery according to an embodiment will be explained.

First, alkali titanate compounds such as $Na_2Ti_3O_7$, $K_2Ti_4O_9$ and $Cs_2Ti_5O_{12}$ are prepared as a starting material. These alkali titanate compounds may be synthesized by blending a material containing Ti with a material containing an alkali element such as Na, K or Cs in a given ratio and by reacting these materials by using a usual solid-phase reaction method. The synthesis using the starting material is performed irrespective of method and crystal form. In this case, potassium titanate such as $K_2Ti_4O_9$ can also be synthesized, for example, by the flux method.

The starting material is washed thoroughly with pure water to remove impurities from the alkali titanate compound and then, treated with an acid to exchange an alkali cation for a proton. A sodium ion, potassium ion and cesium ion in sodium titanate, potassium titanate and cesium titanate respectively can be exchanged for a proton without damaging the crystal structure. The proton exchange by acid treatment can be performed by adding 1 M hydrochloric acid to the starting material, followed by stirring. It is desirable that the acid treatment be carried out until the proton exchange is completed. In the proton exchange, the pH of the solution may be adjusted by addition of an alkaline solution or acid solution. After the proton exchange is completed, the solution is washed with pure water again.

The starting material is preferably milled in advance by using a ball mill before the proton exchange. This milling enables a smooth proton exchange. With regard to milling conditions, the milling is performed by using zirconia balls having a diameter of about 10 to 15 mm per 100 $cm^2$ of a container and by rotating the zirconia balls at 600 to 1000 rpm for about 1 to 6 hours. The milling for less than one hour is undesirable because the starting material is insufficiently milled. Also, the milling for a long time exceeding 6 hours is undesirable because a mechanochemical reaction proceeds, causing phase separation into a compound different from an intended product.

The proton exchange is performed by applying vibrations, for example, an ultrasonic wave, whereby smoother proton exchange can be performed, making it possible to obtain a proton exchanger in a satisfactory state.

Then, the product obtained after the proton exchange is finished is washed with water and dried to synthesize a proton exchanger, which is an intermediate product. In succession, the proton exchanger is heat-treated to produce a titanium composite oxide containing $TiO_2$ (B) as its main phase.

The heating temperature is preferably 300° C. to 600° C. When the heating temperature is less than 300° C., significantly deteriorated crystallinity is obtained and the amount of an impurity phase of $H_2Ti_8O_{17}$ to be mixed is increased, resulting in low electric capacity. When the heating temperature exceeds 600° C., on the other hand, the crystallinity is improved and an impurity phase of $H_2Ti_8O_{17}$ to be mixed is decreased. However, the amount of contamination of an anatase-type $TiO_2$ phase, which is another impurity phase, is increased and there is therefore a fear as to reduced electric capacity. The heating temperature is more preferably 400° C. to 600° C.

The heating treatment is preferably carried out for about 30 minutes or more and 24 hours or less. The time for heating treatment is more preferably one hour or more and 3 hours or less.

In the production of such $TiO_2$ (B), the amount of the impurity phase of anatase-type $TiO_2$ is made to be small or zero by optimizing the aforementioned proton exchange, milling and heating temperature. Namely, the $TiO_2$ (B) having the aforementioned characteristic in which the ratio ($A_2/A_1$) is 0.4 or less can be produced.

In this case, a material obtained by adding at least one element selected from P and B to the alkali titanate compound may be used as the starting material. This starting material can be synthesized by blending the material containing at least one element, a material containing Ti and a material containing an alkali element such as Na, K or Cs in a given ratio and by reacting these materials by using a usual solid-phase reaction method. The amount of the at least one element is preferably 0.01% by weight or more and 3% by weight or less in total based on the total amount of the obtained titanium composite oxide and the at least one element.

The aforementioned at least one element functions as a baking adjuvant in the heat treatment and avoids impurity phases such as $H_2Ti_8O_{17}$ remaining. As a result, this enables the production of a titanium composite oxide which has a large crystallite diameter and is reduced in impurity phase.

The active material for a battery according to the embodiment may be used not only for a negative electrode described later but also for a positive electrode, and contributes to a reduction in the irreversible capacity of an active material and an improvement in charge/discharge cycle characteristics whether it is applied to a negative or positive electrode.

When the active material for a battery according to the embodiment is used for a positive electrode, a metal such as metal lithium and lithium alloy or carbon material such as graphite and coke may be used as the active material of a counter negative electrode.

In general, according to another embodiment, a non-aqueous electrolyte battery includes an outer package, a positive electrode housed in the outer package, a negative electrode which is housed in the outer package in such a manner as to be spaced apart from the positive electrode through, for example, a separator. The negative electrode includes an active material containing a titanium composite oxide, and a non-aqueous electrolyte housed in the outer package, wherein the titanium composite oxide contains a monoclinic β-type titanium composite oxide as its main phase and has the ratio ($A_2/A_1$) which is 0.4 or less. Where $A_1$ is the area intensity of a first peak existing in a frequency range of 105 $cm^{-1}$ to 133 $cm^{-1}$ and $A_2$ is the area intensity of a second peak existing in a frequency range of 134 $cm^{-1}$ to 154 $cm^{-1}$ on a Raman spectrum measured using an argon laser having a wavelength of 514.5 nm.

The outer package, negative electrode, positive electrode, separator and non-aqueous electrolyte, which are structural members of the non-aqueous electrolyte battery, will be explained in detail.

1) Outer Package

As the outer package, a container made of a laminate film having a thickness of 0.5 mm or less or a metal container having a thickness of 1.0 mm or less is used. The metal container preferably has a thickness of 0.5 mm or less.

Examples of the shape of the outer package include a flat type (thin type), angular type, cylinder type, coin type and button type. Examples of the outer package include outer packages for small-sized batteries to be mounted on portable electronic devices and outer packages for large-sized batteries to be mounted on, for example, two- to four-wheel vehicles.

As the laminate film, a multilayer film obtained by interposing a metal layer between resin layers is used. The metal layer is preferably an aluminum foil or aluminum alloy foil, because the foil has light-weight characteristics. Polymer materials such as polypropylene (PP), polyethylene (PE), nylon and polyethylene terephthalate (PET) may be used for the resin layer. The laminate film can be molded into the shape of the outer package with sealing by thermal fusion.

The metal container is constituted of an aluminum, an aluminum alloy or the like. The aluminum alloy is preferably an alloy containing elements such as magnesium, zinc and silicon. When transition metals such as iron, copper, nickel and chromium are contained in the alloy, the amount of these transition metals is preferably 100 ppm or less.

2) Negative Electrode

The negative electrode comprises a current collector and a negative electrode layer which is formed on one or both surfaces of this current collector and contains an active material, a conductive agent and a binder.

The active material for a battery which contains the titanium composite oxide is used as the active material. The titanium composite oxide contains a monoclinic β-type titanium composite oxide as its main phase and has the ratio ($A_2/A_1$) which is 0.4 or less, where $A_1$ is the area intensity of a first peak existing in a frequency range of 105 $cm^{-1}$ to 133 $cm^{-1}$ and $A_2$ is the area intensity of a second peak existing in a frequency range of 134 $cm^{-1}$ to 154 $cm^{-1}$ on a Raman spectrum measured using an argon laser having a wavelength of 514.5 nm. Also, the titanium composite oxide preferably has the characteristic in which the band width of the first peak is 16 $cm^{-1}$ or less.

Such an active material is, as mentioned above, reduced in irreversible capacity in the initial charging and has a high initial charge/discharge efficiency. As a result, a non-aqueous electrolyte battery, into which a negative electrode comprising a negative electrode layer containing this active material is incorporated, is reduced in irreversible capacity, so that the energy density of the battery can be increased.

The conductive agent improves the current collecting performance of the active material and reduces the contact resistance with the current collector. Examples of the conductive agent include acetylene black, carbon black and graphite.

The binder can bind the active material with the conductive agent. Examples of the binder include polytetrafluoroethylene (PTFE), polyvinylidene fluoride (PVdF), fluoro-rubber and styrene-butadiene rubber.

The active material, conductive agent and binder in the negative electrode layer are preferably formulated in ratios of 70% by weight or more and 96% by weight or less, 2% by weight or more and 28% by weight or less and 2% by weight or more and 28% by weight or less, respectively. If the amount of the conductive agent is less than 2% by weight, the current collecting performance of the negative electrode layer is decreased and there is therefore a fear as to decrease in the large-current characteristics. Also, when the amount of the binder is less than 2% by weight, the binding force between the negative electrode layer and the current collector is reduced and there is therefore a fear as to decrease in cycle characteristics. On the other hand, the amounts of the conductive agent and binder are respectively 28% by weight or less, thereby making it possible to accomplish a high capacity.

The current collector is preferably made of an aluminum foil or an aluminum alloy foil containing elements such as Mg, Ti, Zn, Mn, Fe, Cu and Si, which are electrochemically stable in a potential range higher than 0.6 V.

The negative electrode can be manufactured by suspending, for example, the active material, conductive agent and binder in a usual solvent to prepare a slurry, applying this slurry to the surface of the current collector and drying the slurry, followed by pressing. The negative electrode may also be manufactured by forming a pellet essentially consisting of the active material, conductive agent and binder to produce a negative electrode layer, which is then formed on the current collector.

3) Positive Electrode

The positive electrode comprises a current collector and a positive electrode layer which is formed on one or both surfaces of the current collector and contains an active material, a conductive agent and a binder.

As the active material, for example, oxides, polymers and the like may be used.

Examples of the oxides include manganese dioxide ($MnO_2$), iron oxide, copper oxide, nickel oxide which are occluded with lithium, respectively, lithium-manganese composite oxide (for example, $Li_xMn_2O_4$ or $Li_xMnO_2$), lithium-nickel composite oxide (for example, $Li_xNiO_2$), lithium-cobalt composite oxide (for example, $Li_xCoO_2$), lithium-nickel-cobalt composite oxide (for example, $Li_xNi_{1-y}Co_yO_2$), lithium-manganese-cobalt composite oxide (for example, $Li_xMn_yCo_{1-y}O_2$), spinel type lithium-manganese-nickel composite oxide ($Li_xMn_{2-y}Ni_yO_4$), lithium-phosphorous oxide having an olivine structure (for example, $Li_xFePO_4$, $Li_xFe_{1-y}Mn_yPO_4$, $Li_xCoPO_4$), iron sulfate ($Fe_2(SO_4)_3$) and vanadium oxide (for example, $V_2O_5$). Wherein, x and y preferably satisfy the following equations:

$$0<x\leq 1 \text{ and } 0\leq y\leq 1.$$

As the polymer, conductive polymer materials such as polyaniline and polypyrrole or disulfide-based polymer materials may be used. Sulfur (S) or fluorocarbon may also be used as the active material.

Preferable examples of the active material include those having a high positive electrode voltage, for example, lithium-manganese composite oxide ($Li_xMn_2O_4$), lithium-nickel composite oxide ($Li_xNiO_2$), lithium-cobalt composite oxide ($Li_xCoO_2$), lithium-nickel-cobalt composite oxide ($Li_xNi_{1-y}Co_yO_2$), spinel type lithium-manganese-nickel composite oxide ($Li_xMn_{2-y}Ni_yO_4$), lithium-manganese-cobalt composite oxide ($Li_xMn_yCo_{1-y}O_2$), and lithium-iron phosphate ($Li_xFePO_4$). Wherein, x and y preferably satisfy the following equations:

$$0<x\leq 1 \text{ and } 0\leq y\leq 1.$$

A more preferable active material is a lithium-nickel composite oxide. This lithium-nickel composite oxide has an initial efficiency of about 85 to 90%, which is almost the same initial efficiency as the negative electrode active material containing the titanium composite oxide. For this reason, lithium ions can be used without any waste, so that the energy density of the battery can be improved. Consequently, the active material is highly suitable for the lithium-titanium composite oxide contained in the negative electrode active material.

The conductive agent improves the current collecting performance of the active material and reduces the contact resistance with the current collector. Examples of the conductive agent include carbonaceous materials such as acetylene black, carbon black and graphite.

The binder serves to bind the active material with the conductive agent. Examples of the binder include polytetrafluoroethylene (PTFE), polyvinylidene fluoride (PVdF) and fluoro-rubber.

The active material, conductive agent and binder in the positive electrode layer are preferably formulated in ratios of 80% by weight or more and 95% by weight or less, 3% by weight or more and 18% by weight or less and 2% by weight or more and 17% by weight or less, respectively. The conductive agent can produce the aforementioned effect by blending it in an amount of 3% or more. The decomposition of the non-aqueous electrolyte on the surface of the conductive agent when the non-aqueous electrolyte is stored at high temperatures can be reduced by blending it in an amount of 18% by weight or less. When the amount of the binder is designed to be 2% by weight or more, sufficient strength of the positive electrode can be obtained. When the amount of the binder is 17% by weight or less, the amount of the binder to be formulated as an insulating material in the positive electrode can be reduced, making it possible to reduce the internal resistance.

The current collector is preferably made of an aluminum foil or aluminum alloy foil containing elements such as Mg, Ti, Zn, Mn, Fe, Cu and Si.

The positive electrode can be manufactured by suspending, for example, the active material, conductive agent and binder in a usual solvent to prepare a slurry, applying this slurry to the surface of the current collector and drying the slurry, followed by pressing. The positive electrode may also be manufactured by forming a pellet essentially consisting of the active material, conductive agent and binder to produce a positive electrode layer, which is then formed on the current collector.

4) Non-Aqueous Electrolyte

Examples of the non-aqueous electrolyte include liquid non-aqueous electrolytes prepared by dissolving an electrolyte in an organic solvent and gel-like non-aqueous electrolytes obtained by composing a liquid electrolyte with a polymer material.

The liquid non-aqueous electrolyte is preferably prepared by dissolving 0.5 M to 2.5 M of an electrolyte in an organic solvent.

Examples of the electrolyte include lithium salts such as lithium perchlorate ($LiClO_4$), lithium hexafluorophosphate ($LiPF_6$), lithium tetrafluorophosphate ($LiBF_4$), hexafluoro arsenic lithium ($LiAsF_6$), lithium trifluoromethasulfonate ($LiCF_3SO_3$), bistrifluoromethylsulfonylimide lithium ($LiN(CF_3SO_2)_2$), or mixtures of these compounds. The electrolyte is preferably one which is only slightly oxidized at a high potential, and $LiPF_6$ is most preferable.

Examples of the organic solvent include cyclic carbonates such as propylene carbonate (PC), ethylene carbonate (EC) and vinylene carbonate; chain carbonates such as diethyl carbonate (DEC), dimethyl carbonate (DMC) and methylethyl carbonate (MEC); cyclic ethers such as tetrahydrofuran (THF), 2-methyltetrahydrofuran (2MeTHF) and dioxolan (DOX); chain ethers such as dimethoxyethane (DME) and diethoxyethane (DEE); γ-butyrolactone (GBL), acetonitrile (AN) and sulfolan (SL). These organic solvents may be used either singly or in combinations of two or more.

Examples of the polymer include polyvinylidene fluoride (PVdF), polyacrylonitrile (PAN) and polyethylene oxide (PEO).

Preferable examples of the organic solvent include mixture solvents obtained by blending two or more types selected from the group consisting of propylene carbonate (PC), ethylene carbonate (EC) and diethyl carbonate (DEC) or mixture solvents containing γ-butyrolactone (GBL).

5) Separator

Examples of the material of the separator include porous films containing, for example, polyethylene, polypropylene, cellulose or polyvinylidene fluoride (PVdF) and nonwoven fabrics made of synthetic resins. Porous films made of polyethylene or polypropylene are preferable from the viewpoint of safety because they can melt at a fixed temperature to cut off current.

Next, the non-aqueous electrolyte battery (for example, a flat-type non-aqueous electrolyte battery provided with an outer package made of a laminate film) according to the embodiment will be explained in more detail with reference to FIGS. 1 and 2. FIG. 1 is a sectional view of the thin non-aqueous electrolyte battery and FIG. 2 is an enlarged sectional view of the part A shown in FIG. 1. In this case, each of these drawings is a typical view for clarification of one embodiment. Though there are parts different from an actual battery in shape, dimension and ratio, these structural designs may be appropriately changed taking the following explanations and known technologies into consideration.

A flattened wound electrode group 1 is housed in a baggy outer package 2 made of a laminate film obtained by interposing an aluminum foil between two resin layers. The flattened wound electrode group 1 is formed by spirally wounding a laminate obtained by laminating a negative electrode 3, a separator 4, a positive electrode 5 and a separator 4 in this order from the outside and by press-molding the wounded laminate. The outermost negative electrode 3 has a structure in which as shown in FIG. 2, a negative electrode layer 3b is formed on one of the inside surfaces of a current collector 3a. Other negative electrodes 3 each have a structure in which a negative electrode layer 3b is formed on each surface of the current collector 3a. An active material contained in the negative electrode layer 3b includes a titanium composite oxide. The titanium composite oxide contains a monoclinic β-type titanium composite oxide as its main phase and has a ratio ($A_2/A_1$) which is 0.4 or less, where $A_1$ is the area intensity of a first peak existing in a frequency range of 105 cm$^{-1}$ to 133 cm$^{-1}$ and $A_2$ is the area intensity of a second peak existing in a frequency range of 134 cm$^{-1}$ to 154 cm$^{-1}$ on a Raman spectrum measured using an argon laser having a wavelength of 514.5 nm. Also, the titanium composite oxide preferably has the characteristic in which a band width of the first peak is 16 cm$^{-1}$ or less.

The positive electrode 5 has a structure provided with a positive electrode layer 5b on each side of a current collector 5a.

In the vicinity of the outer peripheral end of the flattened wound electrode group 1, a negative electrode terminal 6 is connected to the current collector 3a of the outermost negative electrode 3 and a positive electrode terminal 7 is connected to the current collector 5a of the internal positive electrode 5. These negative electrode terminal 6 and positive electrode terminal 7 are externally extended from an opening part of the baggy outer package 2. A liquid non-aqueous electrolyte is, for example, injected from the opening part of the baggy outer package 2. The opening part of the baggy outer package 2 is closed by heat sealing with the negative electrode terminal 6 and positive electrode terminal 7 caught in the opening part to thereby perfectly seal the flattened wound electrode group 1 and liquid non-aqueous electrolyte.

The negative electrode terminal is made of, for example, a material having electric stability and conductivity in a potential range of 0.6 V to 3.0 V with respect to a lithium ion metal. Examples of the material for the negative electrode terminal include an aluminum or an aluminum alloy containing elements such as Mg, Ti, Zn, Mn, Fe, Cu and Si. The negative electrode terminal is preferably made of the same material as the negative electrode current collector to reduce the contact resistance with the negative electrode current collector.

The positive electrode terminal is made of, for example, a material having electric stability and conductivity in a potential range of 3.0 V to 4.5 V with respect to a lithium ion metal. Specific examples of the material for the positive electrode terminal include an aluminum or an aluminum alloy containing elements such as Mg, Ti, Zn, Mn, Fe, Cu and Si. The positive electrode terminal is preferably made of the same material as the positive electrode current collector to reduce the contact resistance with the positive electrode current collector.

In general, according to another embodiment, a battery pack includes two or more of the non-aqueous electrolyte batteries which are electrically connected each other in series or in parallel, or in series and parallel.

Such a battery pack has excellent cycle characteristics. Specifically, the titanium composite oxide contained in the negative electrode active material of the negative electrode is reduced in impurity phases and hence has high crystallinity. Therefore, the non-aqueous electrolyte battery provided with this negative electrode can be improved in large-current characteristics and charge/discharge cycle characteristics. As a result, the battery pack into which two or more of such batteries are incorporated can be improved in charge/discharge cycle characteristics even in the case of charging/discharging under a large current.

Next, the battery pack according to this embodiment will be explained in detail with reference to FIGS. 3 and 4. The flat-type non-aqueous electrolyte battery shown in FIG. 1 is used as the unit cell.

Plural unit cells 21 are laminated such that the externally extended negative electrode terminal 6 and positive electrode terminal 7 are arranged in the same direction and fastened with an adhesive tape 22 to thereby constitute a battery assembly 23. These unit cells 21 are electrically connected each other in series as shown in FIG. 4.

A print wiring board 24 is disposed opposite to the side surface of the unit cell 21 from which the negative electrode terminal 6 and positive electrode terminal 7 extend. As shown in FIG. 4, a thermistor 25, a protective circuit 26 and an energizing terminal 27 connected to external devices are mounted on the print wiring board 24. An insulating plate (not shown) is attached to the surface of the print wiring substrate 24 facing the battery assembly 23 to avoid unnecessary connection with the wiring of the battery assembly 23.

One of the ends of the positive electrode side lead 28 is connected with the positive electrode terminal 7 positioned on the lowermost layer of the battery assembly 23 and the other end is inserted into a positive electrode side connector 29 of the print wiring board 24 to be electrically connected with the print wiring board 24. One of the ends of the negative electrode side lead 30 is connected with the negative electrode terminal 6 positioned on the uppermost layer of the battery assembly 23 and the other end is inserted into a negative electrode side connector 31 of the print wiring board 24 to be electrically connected with the print wiring board 24. These connectors 29 and 31 are connected to the protective circuit 26 through wirings 32 and 33 formed on the print wiring board 24.

The thermistor 25 is used to detect the temperature of the unit cell 21 and the detection signals are transmitted to the protective circuit 26. The protective circuit 26 can shut off a plus side wiring 34a and minus side wiring 34b between the protective circuit 26 and the energizing terminal 27 connected to external devices under a predetermined condition. The predetermined condition means, for example, the case where the temperature detected by the thermistor 25 is above a predetermined one. Also, the predetermined condition means, for example, the case of detecting overcharge, over-discharge and over-current of the unit cell 21. The detection of this overcharge and the like is made for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIGS. 3 and 4, a wiring 35 for detecting voltage is connected to each unit cell 21 and the detected signals are transmitted to the protective circuit 26 through these wirings 35.

A protective sheet 36 made of a rubber or resin is disposed on each of the three side surfaces of the battery assembly 23 other than the side surface from which the positive electrode terminal 7 and negative electrode terminal 6 are projected.

The battery assembly 23 is housed in a housing tank 37 together with each protective sheet 36 and print wiring board 24. Specifically, the protective sheet 36 is disposed on each inside surface in the direction of the long side and on one of the inside surfaces in the direction of the short side of the receiving tank 37, and the print wiring board 24 is disposed on the other inside surface in the direction of the short side. The battery assembly 23 is positioned in a space enclosed by the protective sheets 36 and the print wiring board 24. A lid 38 is attached to the upper surface of the receiving tank 37.

Here, a thermally contracting tape may be used in place of the adhesive tape 22 to secure the battery assembly 23. In this case, after the protective sheet is disposed on both sides of the battery assembly and the thermally contracting tapes are wound around the battery assembly, the thermally contracting tape is contracted by heating to fasten the battery assembly.

The structure in which the unit cells 21 are connected in series is shown in FIGS. 3 and 4. However, with regard to these unit cells 21, either parallel or series-parallel cell connections may be used to increase the capacity of the battery. The assembled battery packs may be further connected in series or parallel.

Also, the structure of the battery pack is appropriately changed according to its use. The battery pack is preferably used in applications exhibiting excellent cycle characteristics when a large current is extracted. Examples of these applications include power sources for digital cameras, and power sources mounted on vehicles such as two- to four-wheel hybrid electric cars, two- to four-wheel electric cars and assist bicycles. The battery pack is preferably used for power sources mounted on vehicles.

As mentioned above, a non-aqueous electrolyte battery superior in high-temperature characteristics can be obtained by using a non-aqueous electrolyte containing a mixture solvent obtained by blending two or more types selected from the group consisting of propylene carbonate (PC), ethylene carbonate (EC) and diethyl carbonate (DEC) or mixture solvents containing γ-butyrolactone (GBL). A battery pack provided with a battery assembly comprising two or more of such non-aqueous electrolyte batteries is preferable for power sources mounted on vehicles.

EXAMPLES

The embodiment will be explained in more detail by way of examples.

Example 1

Production of a Titanium Composite Oxide

First, potassium carbonate ($K_2CO_3$) and anatase-type titanium oxide ($TiO_2$) were mixed and the mixture was baked at 1000° C. for 24 hours to synthesize $K_2Ti_4O_9$. The obtained $K_2Ti_4O_9$ was pulverized with zirconia beads under a dry condition for one hour to adjust the grain size (Step 1). After that, the pulverized product was washed with pure water to prepare a protonic exchange precursor. The obtained protonic exchange precursor was poured into a 1 M hydrochloric acid solution and the solution was stirred at 25° C. for one day. This operation was repeated twice and hydrochloric acid was exchanged each time and then, the resulting product was washed with pure water to obtain a proton exchanger (Step 2). In succession, the obtained proton exchanger was baked at 400° C. in air for 3 hours (Step 3), thereby producing a titanium composite oxide.

Each condition in Steps 1 to 3 is shown in the following Table 1.

Figure 5:
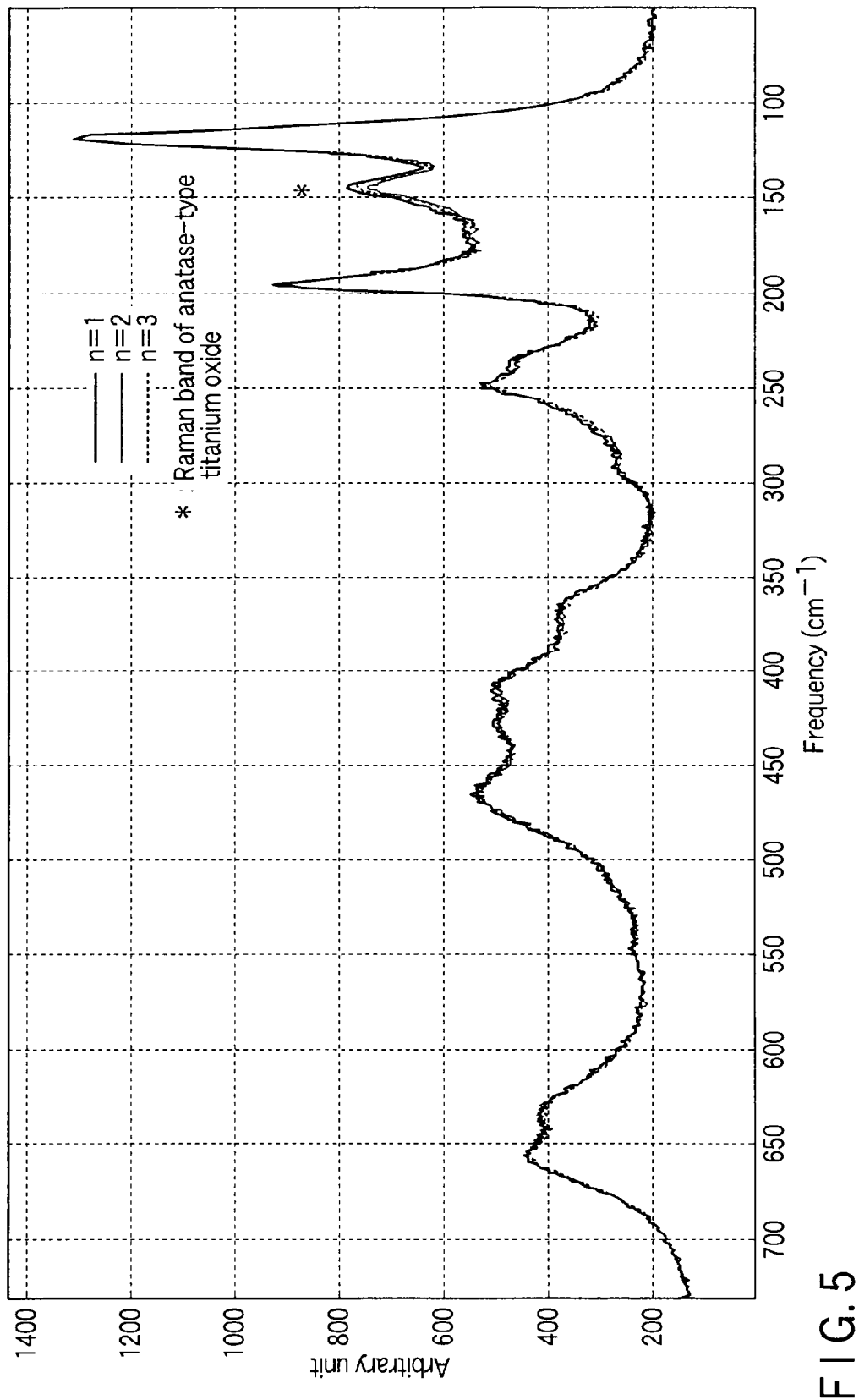
FIG. 5 is a graph showing the Raman spectrum of a titanium composite oxide of Example 1.

Raman spectroscopic analysis of the obtained titanium composite oxide was performed by the aforementioned measuring method using a glass sample plate for filling a titanium composite oxide powder manufactured in the following condition at three random positions to obtain the three Raman spectra shown in FIG. 5.

Specifically, the titanium composite oxide powder was dispersed on the glass sample plate and a glass plate was put on the dispersed powder by hand and pressed lightly from above, thereby filling the powder into the glass sample plate.

The ratio ($A_2/A_1$), where $A_1$ was the area intensity of a first peak existing in a frequency range of 105 $cm^{-1}$ to 133 $cm^{-1}$ and $A_2$ was the area intensity of a second peak existing in a frequency range of 134 $cm^{-1}$ to 154 $cm^{-1}$ on the obtained Raman spectrum, was calculated. The area intensities $A_1$ and $A_2$ were measured in the following manner.

In the Raman spectrum obtained after the measurement, a base line was drawn as a straight line in a frequency range of 70 to 170 $cm^{-1}$. A Lorentz function was assumed as the spectrum in the vicinities of frequencies of 119 $cm^{-1}$ and 144 $cm^{-1}$ and calculation for optimization was performed using the least square method to separate the peaks. Each area of the separated peaks was calculated as the area intensity.

An average of the obtained ratios ($A_2/A_1$) of area intensities and an average of the band width of the first peak were calculated. The results are shown in the following Table 2.

<Production of an Electrode>

90% by weight of the obtained titanium composite oxide powder, 10% by weight of acetylene black and 10% by weight of polyvinylidene fluoride (PVdF) were added to and mixed with N-methylpyrrolidone (NMP) to prepare a slurry. This slurry was applied to both surfaces of a current collector made of an aluminum foil having a thickness of 15 μm and dried, followed by pressing to manufacture a negative electrode having an electrode density of 1.6 $g/cm^3$.

<Preparation of a Liquid Non-Aqueous Electrolyte>

One mole of $LiPF_6$ was dissolved as an electrolyte in a mixture solvent of ethylene carbonate (EC) and diethyl carbonate (DEC) (volumetric ratio is 1:2) to prepare a liquid non-aqueous electrolyte (non-aqueous electrolyte solution).

<Fabrication of a Glass Cell>

The electrodes were respectively cut into a size of 20 mm×20 mm and a lithium metal which was to be a counter electrode was made to face the electrode through a glass filter to manufacture an electrode group using the lithium metal as a reference electrode. This electrode group was disposed in a glass cell and the liquid non-aqueous electrolyte was filled in an argon atmosphere to fabricate a glass cell (non-aqueous electrolyte secondary battery).

Examples 2 to 7 and Comparative Examples 1 and 2

Titanium composite oxides were produced in the same method as in Example 1 except that the conditions of the Steps 1 to 3 were changed to those shown in the following Table 1 in the production of a titanium composite oxide. A glass cell (non-aqueous electrolyte secondary battery) was fabricated in the same manner as in Example 1 except that these titanium composite oxides were respectively used as the active material of the electrode.

Figure 6:
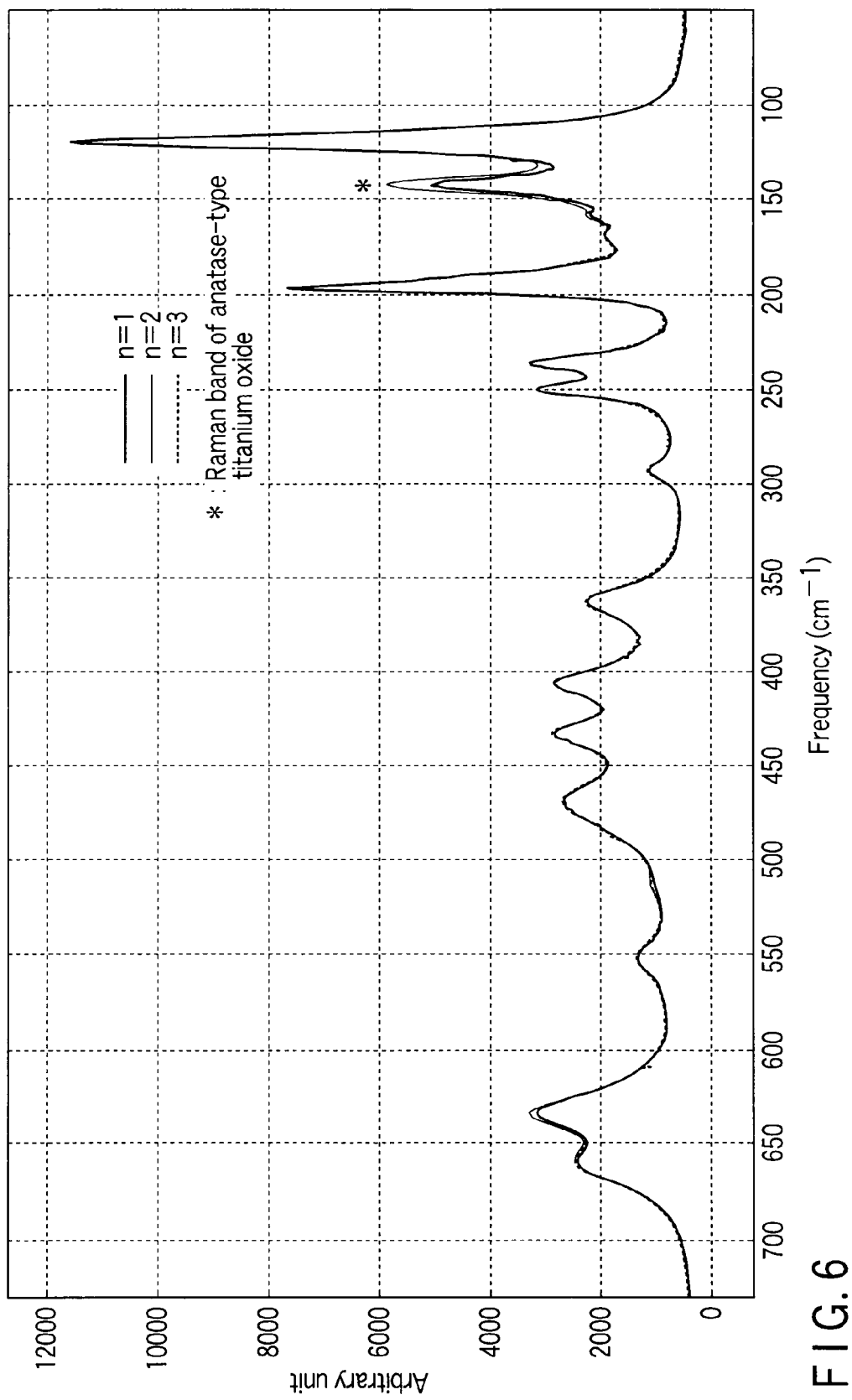
FIG. 6 is a graph showing the Raman spectrum of a titanium composite oxide of Comparative Example 2.

In addition, using the titanium composite oxide of Comparative Example 1 obtained under the conditions of Steps 1 to 3 shown in the following Table 1, the same glass sample plate for filling a titanium composite oxide powder was manufactured and Raman spectroscopic analysis was performed by the aforementioned measuring method at three random positions of the glass sample plate. The three Raman spectra obtained by the Raman spectral analysis are shown in FIG. 6.

An average of the obtained ratios $(A_2/A_1)$ of area intensities and an average of the band width of the first were calculated in the same manner as in Example 1. The results are shown in the following Table 2.

Lithium ions were inserted (charged) into each glass cell obtained in Examples 1 to 7 and Comparative Examples 1 and 2 at 25° C. under 0.2 C current until the voltage was dropped to 1.0 V. After that, lithium ions were desorbed (discharged) at the same temperature (25° C.) under 0.2 C current until the voltage was raised to 3.0 V. The discharge capacity at this time was converted into the quantity of electricity (mAh/g) per weight of the titanium composite oxide which was the negative electrode active material. Also, the initial charge/discharge efficiency (%) was calculated. The results are shown in Table 2 below. Here, a current "1 C" means the current value required to fully discharge a battery in one hour, and the rated capacity of a battery may be replaced with a 1 C current value for the sake of convenience. Therefore, 0.2 C is the current value required to fully discharge the rated capacity in 5 hours.

TABLE 1

| | Condition of production of titanium composite oxide | | |
|---|---|---|---|
| | Step 1: Milling time | Step 2: Days required for making protonic exchange body | Step 3: Baking temperature |
| Example 1 | 1 hour | 2 days | 400° C. |
| Example 2 | 3 hour | 2 days | 400° C. |
| Example 3 | 6 hour | 2 days | 400° C. |
| Example 4 | 6 hour | 5 days | 600° C. |
| Example 5 | 3 hour | 5 days | 400° C. |
| Example 6 | 3 hour | 5 days | 500° C. |
| Example 7 | 3 hour | 5 days | 600° C. |
| Comparative Example 1 | 30 minutes | 1 days | 400° C. |
| Comparative Example 2 | 1 hour | 2 days | 700° C. |

TABLE 2

| | Ratio of integral area intensities $(A_2/A_1)$ | Band width $(cm^{-1})$ | Capacity (mAh/g) | Initial charge/discharge efficiency (%) |
|---|---|---|---|---|
| Example 1 | 0.372 | 14.0 | 213 | 90 |
| Example 2 | 0.352 | 15.2 | 232 | 87 |
| Example 3 | 0.209 | 16.0 | 242 | 86 |
| Example 4 | 0.205 | 9.2 | 248 | 93 |
| Example 5 | 0.141 | 12.0 | 252 | 92 |
| Example 6 | 0.295 | 11.1 | 245 | 93 |
| Example 7 | 0.341 | 10.0 | 242 | 93 |
| Comparative Example 1 | 0.401 | 18.2 | 150 | 68 |
| Comparative Example 2 | 0.498 | 12.0 | 153 | 73 |

As is clear from Tables 1 and 2, it is found that each of the glass cells of Examples 1 to 7, which are provided with an electrode containing a titanium composite oxide having a ratio $(A_2/A_1)$ which is 0.4 or less as the active material of the negative electrode, is superior both in capacity and initial charge/discharge efficiency to each of the glass cells of Comparative Examples 1 and 2, which are provided with an electrode containing a titanium composite oxide having a ratio $(A_2/A_1)$ which exceeds 0.4 as the active material of the negative electrode.

It is also found that, particularly, among the glass cells of Examples 1 to 7, each of the glass cells of Examples 1, 4, and 5 to 7 provided with an electrode containing a titanium composite oxide having a band width of 14 $cm^{-1}$ or less as the active material of the negative electrode have an even higher initial charge/discharge efficiency.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A negative electrode active material for a battery, comprising a titanium system oxide selected from a titanium oxide and a titanium composite oxide, wherein the titanium system oxide contains a monoclinic β-type titanium composite oxide as its main phase and has a ratio $(A_2/A_1)$ which is 0.4 or less, where $A_1$ is an area intensity of a first peak existing in a frequency range of 105 $cm^{-1}$ to 133 $cm^{-1}$ and $A_2$ is an area intensity of a second peak existing in a frequency range of 134

$cm^{-1}$ to 154 $cm^{-1}$ on a Raman spectrum measured using an argon laser having a wavelength of 514.5 nm, wherein at least one element selected from P and B is further added to the titanium system oxide, an amount of the at least one element is 0.01% by weight or more and 3% by weight or less based on a total amount of the titanium system oxide and the at least one element.

2. The active material of claim 1, wherein the ratio $(A_2/A_1)$ is 0.35 or less.

3. The active material of claim 1, wherein a band width of the first peak is 16 $cm^{-1}$ or less.

4. The active material of claim 3, wherein the band width of the first peak is 14 $cm^{-1}$ or less.

5. The active material of claim 1, wherein the titanium composite oxide has a primary particle diameter of 30 nm or more and 3 µm or less.

6. A non-aqueous electrolyte battery comprising:
an outer package;
a positive electrode housed in the outer package;
a negative electrode which is housed in the outer package in such a manner as to be spaced apart from the positive electrode and includes an active material containing a titanium system oxide selected from a titanium oxide and a titanium composite oxide; and
a non-aqueous electrolyte housed in the outer package,
wherein the titanium system oxide contains a monoclinic β-type titanium composite oxide as its main phase and has a ratio $(A_2/A_1)$ which is 0.4 or less, where $A_1$ is an area intensity of a first peak existing in a frequency range of 105 $cm^{-1}$ to 133 $cm^{-1}$ and $A_2$ is an area intensity of a second peak existing in a frequency range of 134 $cm^{-1}$ to 154 $cm^{-1}$ on a Raman spectrum measured using an argon laser having a wavelength of 514.5 nm, and at least one element selected from P and B is further added to the titanium system oxide, the amount of the at least one element is 0.01% by weight or more and 3% by weight or less based on a total amount of the titanium system oxide and the at least one element.

7. The battery of claim 6, wherein the spacing between the positive electrode and the negative electrode is carried out by disposing a separator between the electrodes.

8. The battery of claim 6, wherein the ratio $(A_2/A_1)$ is 0.35 or less.

9. The battery of claim 6, wherein a band width of the first peak is 16 $cm^{-1}$ or less.

10. The battery of claim 9, wherein the band width of the first peak is 14 $cm^{-1}$ or less.

11. The battery of claim 6, wherein the titanium composite oxide has a primary particle diameter of 30 nm or more and 3 µm or less.

12. The battery of claim 6, wherein the positive electrode contains a lithium-nickel composite oxide.

13. The battery of claim 6, wherein the outer package is formed of a laminate film.

14. A battery pack comprising a plurality of the non-aqueous electrolyte batteries according to claim 6, which are electrically connected each other in series, in parallel or in series-parallel.

15. The battery pack of claim 14, further comprising a protective circuit capable of detecting a voltage of each non-aqueous electrolyte battery.

* * * * *